US010814337B2

(12) United States Patent
Jin et al.

(10) Patent No.: US 10,814,337 B2
(45) Date of Patent: Oct. 27, 2020

(54) COMPOSITE OZONE FLOTATION INTEGRATED DEVICE

(71) Applicant: Xi'an University of Architecture and Technology, Xi'an (CN)

(72) Inventors: Pengkang Jin, Xi'an (CN); Xin Jin, Xi'an (CN); Rui Wang, Xi'an (CN)

(73) Assignee: XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 0 days.

(21) Appl. No.: 16/619,678

(22) PCT Filed: Apr. 13, 2018

(86) PCT No.: PCT/CN2018/082901

§ 371 (c)(1),
(2) Date: Dec. 5, 2019

(87) PCT Pub. No.: WO2019/011023

PCT Pub. Date: Jan. 17, 2019

(65) Prior Publication Data

US 2020/0147621 A1 May 14, 2020

(30) Foreign Application Priority Data

Jul. 11, 2017 (CN) .......................... 2017 1 0573796

(51) Int. Cl.
*B03D 1/14* (2006.01)
*C01B 13/10* (2006.01)
(Continued)

(52) U.S. Cl.
CPC ................ *B03D 1/14* (2013.01); *C01B 13/10* (2013.01); *C02F 1/006* (2013.01); *C02F 1/24* (2013.01); *C02F 1/52* (2013.01); *C02F 1/78* (2013.01)

(58) Field of Classification Search
None
See application file for complete search history.

(56) References Cited

U.S. PATENT DOCUMENTS 5,776,335 A * 7/1998 Overath ................ B01D 24/12 210/167.21

FOREIGN PATENT DOCUMENTS

| | | |
|---|---|---|
| AU | 4026095 A | 2/1996 |
| CN | 2401273 Y | 10/2000 |

(Continued)

OTHER PUBLICATIONS

PCT, International Search Report for International Application No. PCT/CN2018/082901, dated Jun. 26, 2018, 5 pages (including Chinese and English versions).

(Continued)

*Primary Examiner* — Richard C Gurtowski
(74) *Attorney, Agent, or Firm* — Hang Gao

(57) ABSTRACT

A composite ozone flotation integrated device may include a cylinder body, an intermediate cylinder, and a central cylinder which are coaxial. The cylinder body and the center cylinder have a common bottom. The cylinder body and the intermediate cylinder have a common top. The intermediate cylinder is arranged on support channel steel between the cylinder body and the center cylinder. A top of the center cylinder is in the intermediate cylinder. The top of the center cylinder is open-mouthed. An upper part of the cylinder body is provided with a drainpipe. The top of the cylinder body is provided with an inner cylinder exhaust pipe and a slag discharge pipe. An upper part of the intermediate cylinder is provided with an outer cylinder exhaust pipe. A lower part of the center cylinder is connected to a water inlet pipe, a dissolved gas inlet pipe, and a venting and sludge-discharge pipe.

10 Claims, 3 Drawing Sheets

(51) Int. Cl.

| | |
|---|---|
| ***C02F 1/00*** | (2006.01) |
| *C02F 1/24* | (2006.01) |
| *C02F 1/52* | (2006.01) |
| *C02F 1/78* | (2006.01) |

(56) References Cited

FOREIGN PATENT DOCUMENTS

| | | | |
|---|---|---|---|
| CN | 102512854 | A | 6/2012 |
| CN | 104326522 | A | 2/2015 |
| CN | 105130031 | A | 12/2015 |
| CN | 106277151 | A | 1/2017 |
| CN | 107188339 | A | 9/2017 |
| JP | 2005169304 | A | 6/2005 |

OTHER PUBLICATIONS

PCT, Written Opinion of the International Searching Authority for International Application No. PCT/CN2018/082901, dated Jun. 26, 2018, 10 pages (including Chinese and English versions).

* cited by examiner

COMPOSITE OZONE FLOTATION INTEGRATED DEVICE

CROSS-REFERENCE TO RELATED APPLICATIONS

This application is a national phase application of International Application No. PCT/CN2018/082901, filed on Apr. 13, 2018, which claims priority to Chinese Patent Application No. 201710573796.3, filed on Jul. 11, 2017, each of which is hereby incorporated by reference in its entirety.

TECHNICAL FIELD

The present disclosure pertains to the field of sewage/wastewater treatment technologies and relates to sewage/wastewater advanced treatment technologies, and more particularly, to a composite ozone flotation integrated device.

BACKGROUND

Ozone is a reactive molecule having strong oxidability. It has a potential oxidation-reduction of 2.07V, which is second only to fluorine. Ozone is widely used in feedwater treatment and sewage treatment of micro-polluted source water. Air floatation may efficiently separate suspended substances in water and may enable simple operation and low operating costs. An ozone floatation technology may be created upon the combination and synergistic utilization of ozone oxidation characteristics and flotation separation characteristics. In practice, traditional equipment may have various pipelines for water inlet, agent feed, ozone and air feed, water drainage, air exhaust, and slag discharge, and may have various functions such as ozonation, coagulation and flotation, etc. However, the shape of the traditional equipment may limit the convenience of operation. In addition, after the coagulation and flotation reaction in the tank body, most of the flocculated sludge generated may be carried by the dissolved gas to the top of a slag discharge port and be discharged therefrom. During the intermittent period of operation and the disturbance of water flow, some scums may inevitably deposit on the bottom of the tank body. The sludge deposited on the bottom of the tank body may be carried to a water outlet by the water flow, which may reduce the efficiency of the removal of organic matters and suspended substances in the effluent, and may thus have a negative effect on the regular operation of the ozone flotation device. Limited to the existing dissolved gas technologies, ozone generated by ozone generators is mostly wasted. Meanwhile, a vertical ozone flotation device may have an unreasonable height to ensure its air floatation effect, which may cause a lot of inconvenience to manufacturing, installation, and debugging.

SUMMARY

An objective of the present disclosure is to provide a composite ozone flotation integrated device that overcomes the disadvantages of the prior art, which utilizes special three-layer structures (e.g., a center cylinder, an intermediate cylinder, and a container wall) to implement partition ozonation, flotation separation and automatic slag discharge, etc. Advantages of the composite ozone flotation integrated device may include quick installation, simple operation, and high processing efficiency.

To implement the above objective, the present disclosure provides technical solutions as described below.

A composite ozone flotation integrated device may include a cylinder body 6, an intermediate cylinder 7, and a center cylinder 8, which may be coaxial. The cylinder body 6 and the center cylinder 8 may have a common bottom. The cylinder body 6 and the intermediate cylinder 7 may have a common top. The intermediate cylinder 7 may be arranged on support channel steel 4 between the cylinder body 6 and the center cylinder 8. A top of the center cylinder 8 may be located in the intermediate cylinder 7. The top of the center cylinder 8 may be open-mouthed. An upper part of the cylinder body 6 may be provided with a drainpipe 14. A top of the cylinder body 6 may be provided with an inner cylinder exhaust pipe 12 and a slag discharge pipe 9. An upper part of the intermediate cylinder 7 may be provided with an outer cylinder exhaust pipe 13. A lower part of the center cylinder 8 may be connected to a water inlet pipe 15, a dissolved gas inlet pipe 1, and a venting and sludge-discharge pipe 16 that may be connected to an inner cylinder. An annular aeration pipe 5 having an aeration inner wire head 18 may be provided at a lower position between the cylinder body 6 and the intermediate cylinder 7. The annular aeration pipe 5 may be connected to an air inlet pipe 25. A lower part of the cylinder body 6 may be connected to a venting and sludge-discharge pipe 2 that may be connected to an outer cylinder. A contact region A may be formed in the center cylinder 8. A flotation separation region B may be formed at the upper part of the intermediate cylinder 7. A slag discharge region C may be formed on the top of the intermediate cylinder 7. A sludge precipitation region D may be formed at a lower region between the cylinder body 6 and the center cylinder 8. An ozone oxidation region E may be formed at a lower region between the cylinder body 6 and the intermediate cylinder 7.

The bottom of the cylinder body 6 may include a bottom plate 26. The top of the cylinder body 6 may have a top cover 11. The bottom plate 26 may be arranged on an equipment base 27. The top cover 11 may be a conical top. The inner cylinder exhaust pipe 12 may be connected to the top cover 11. The bottom of the cylinder body 6 may be a conical sludge discharge hopper 3. A centerline incline angle at a conical outlet of the conical sludge discharge hopper 3 may range from 30° to 45°.

The upper part of the intermediate cylinder 7 may be connected to the top thereof through a scum guidance taper 10. The scum guidance taper 10 may be a conical horn-shaped structure. A centerline incline angle at a conical outlet of the scum guidance taper 10 may be an angle ranging from 80° to 85°. The outer cylinder exhaust pipe 13 is connected to the scum guidance taper 10.

The top of the center cylinder 8 may be provided with a guidance swash plate 22. The guidance swash plate 22 may be a conical horn-shaped structure. A centerline incline angle at a conical outlet of the guidance swash plate 22 may be an angle ranging from 40° to 50°.

The upper part of the cylinder body 6 is provided, around the intermediate cylinder 7, with a zigzag overflow weir 19, and the drainpipe 14 is arranged at a bottom of the overflow weir 19.

The water inlet pipe 15 may be connected to a water inlet pump and a coagulant dosing pump outlet pipe. The water inlet pipe 15 may tangentially conveys=raw water to the center cylinder 8. An end of the dissolved gas inlet pipe 1 may be provided with an ozone-dissolved air releaser 21.

The inner cylinder exhaust pipe 12 and the outer cylinder exhaust pipe 13 may be connected, via an exhaust tee 23, to an exhaust manifold provided with an electric exhaust valve 24. The drainpipe 14 may be provided with an outlet electric valve 20, the inner cylinder venting and sludge-discharge pipe 16 may be provided with a center cylinder venting electric valve 17. The outer cylinder venting and sludge-discharge pipe 2 is provided with a sludge hopper venting electric valve 28.

The electric exhaust valve 24, the outlet electric valve 20, the center cylinder venting electric valve 17, and the sludge hopper venting electric valve 28 may be connected to a time relay and are automatically turned on/off according to preset interval time.

The water inlet pipe 15 may be connected to a water inlet pump and a coagulant dosing pump outlet pipe.

A ratio of the height of cylinder body 6 to the height of the intermediate cylinder 7 to the height of the center cylinder 8 may be 10:6.5~8:4~5. A ratio of a diameter of the cylinder body 6 to a bottom diameter of the intermediate cylinder 7 and to a diameter of the center cylinder 8 may be 5:(3~3.5):(1~1.5). A ratio of the volume of the contact region A to the volume of the sludge precipitation region D to the volume of the slag collection region C to the volume of the ozone oxidation region E, and to the ratio of the flotation separation region B may be 1:5:5:15:20. A top of the inner cylinder exhaust pipe 12 and a top of the outer cylinder exhaust pipe 13 may be about 0.9 m to 1.2 m higher than that of the slag discharge pipe 9.

Compared with the prior art, the present disclosure may provide the following advantages.

1. Tangential Nozzle Structure of the Water Inlet Pipe

Water is tangentially supplied through the water inlet pipe 15 of the present disclosure, which improves the hydrocyclone strength, such that contact and mixture of gas, solid and liquid can be increased, reaction efficiency can be improved, and equipment volumetric load rate can be increased.

2. Center Cylinder, Intermediate Cylinder, and Cylinder Wall Composite Structures The three-layer composite structure of the device may divide the reactor space into three layers: an inner layer, a middle layer, and an outer layer. Each layer may have corresponding functions based on the water treatment process and does not interfere with each other. The whole device may include a scum removal region, a flotation separation region, and a sludge precipitation region from top to bottom, wherein each region has specific functions.

3. Control of Scum Discharge Procedures

Operations of the ozone flotation device may include water feeding, slag discharge, liquid level reduction, water refeeding, etc. A device water inlet pump, the electric exhaust valve 24 and the outlet electric valve 20 may be controlled by a time relay or a programmable logic controller (PLC). The electric exhaust valve 24 and the outlet electric valve 20 are controlled in linkage and may be in an "on" or "off" state simultaneously. The operation and the slag discharge are alternated by turning on/off the valve.

4. Bottom Precipitated Self-Cleaning Sludge System

Sludge is precipitated in the inner cylinder and on the bottom of the tank, which is controlled by a sludge-water interface meter. When the sludge surface is close to 50% of the bottom height, sludge is automatically discharged by controlling the center cylinder venting electric valve 17 and the sludge hopper venting electric valve 28.

Accordingly, the present disclosure changes the mode of the previous high-efficiency ozone flotation device that relies on U-shaped tubes to implement multi-stage ozone flotation, and completes four processes of reaction, separation, oxidation and precipitation through the inner layer, the middle layer, and the outer layer structures. According to the tangential water feed mode provided by the present disclosure, water is fed in a swirling upward direction, such that the system consumes the minimum energy, and gas, water, and agents are mixed evenly. According to the present disclosure, after the ozone and the coagulant are added, they are evenly distributed into the center cylinder through the mixing process to complete the oxidation reaction. While organic matters are oxidized and removed, suspended substances can be carried by tiny bubbles to the top and discharged through the slag discharge pipe.

DETAILED DESCRIPTION OF THE EMBODIMENTS

Contents of the present disclosure are described below with reference to the accompanying drawings, and the following descriptions are exemplary and explanatory only and are not restrictive of the scope of protection of the present disclosure.

Figure 1:
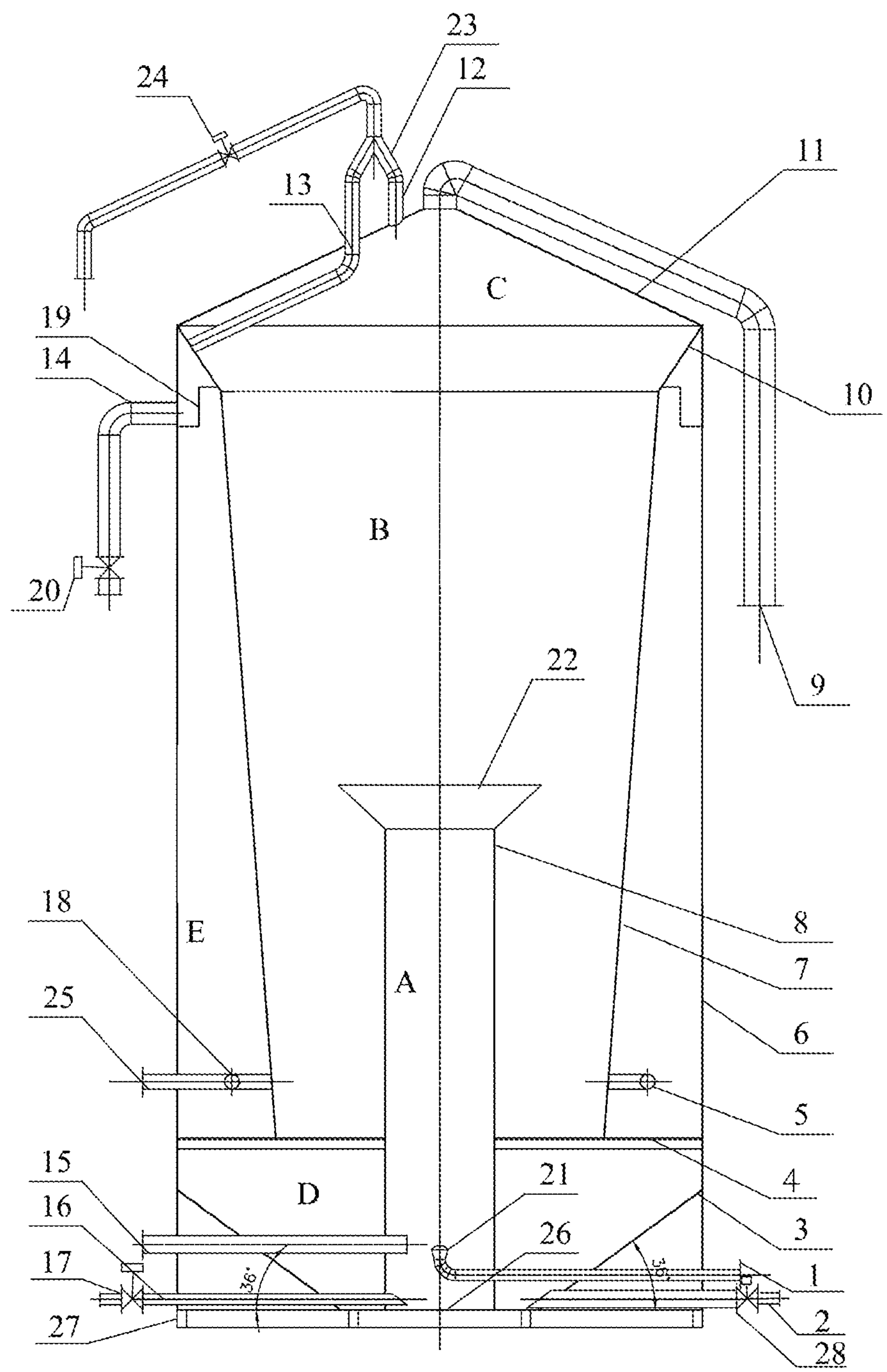
FIG. 1 is a schematic structural diagram of a composite ozone flotation integrated device according to the present disclosure.
Figure 2:
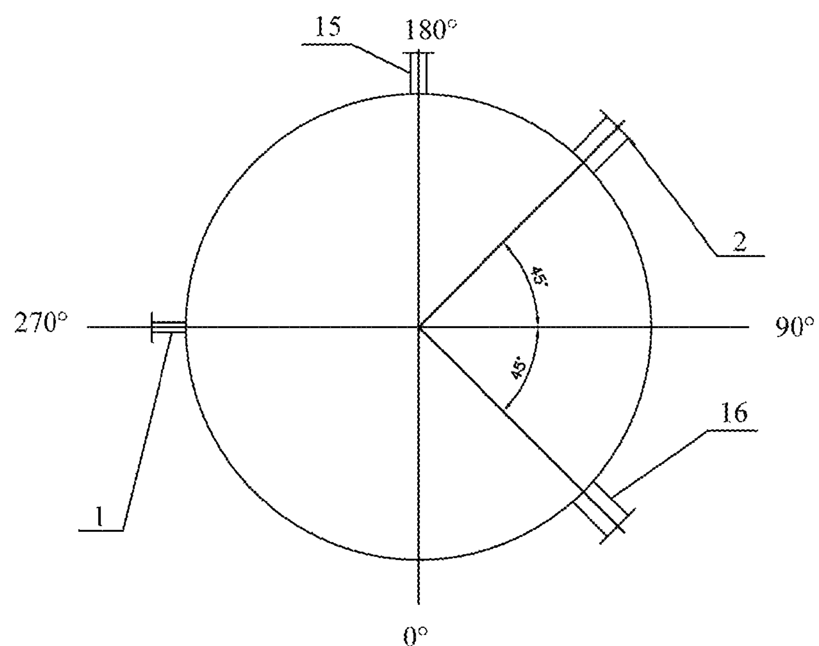
FIG. 2 is a planar structural diagram of a pipeline at a bottom layer according to the present disclosure.
Figure 3:
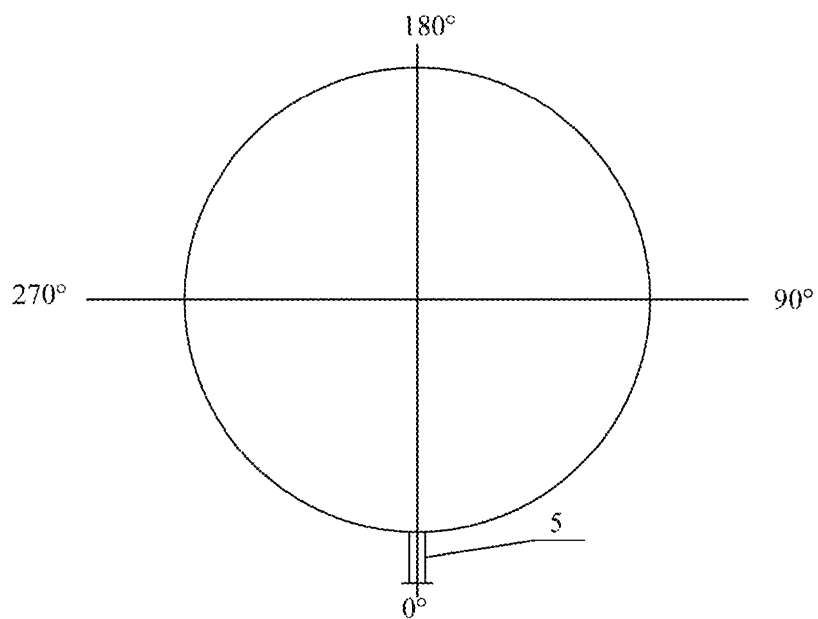
FIG. 3 is a planar structural diagram of a pipeline at a middle layer according to the present disclosure.
Figure 4:
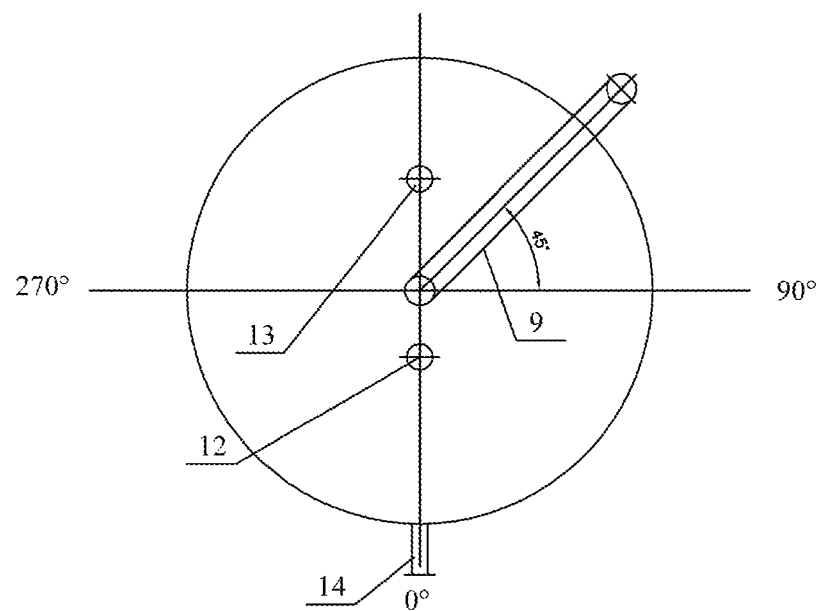
FIG. 4 is a planar structural diagram of a pipeline at a top layer according to the present disclosure.

As shown in FIGS. 1, 2, 3, and 4, a system may include a shell, a water inlet and outlet unit, an ozone flotation unit, an ozone oxidation unit, a slag discharge system, a sludge discharge system, etc.

The shell may include a cylinder body 6, a top cover 11, a bottom plate 26, and an equipment base (27), etc.

The water inlet and outlet unit may include a water inlet pipe 15, a dissolved gas inlet pipe 1, and a drainpipe 1, etc.

The ozone flotation unit may include a center cylinder 8, an ozone-dissolved air releaser 21, an intermediate cylinder 7, etc.

The ozone oxidation unit may include an air inlet pipe 25, an annular aeration pipe 5, and the like.

The slag discharge system may include an inner cylinder exhaust pipe 12, an outer cylinder exhaust pipe 13, a slag discharge pipe 9, and the like.

The sludge discharge system may include an outer cylinder venting and sludge-discharge pipe 2, an inner cylinder venting and sludge-discharge pipe 16, and the like.

Specifically, the cylinder body 6, the intermediate cylinder 7, and the center cylinder 8 may be arranged coaxially. The cylinder body 6 and the center cylinder 8 may have a common bottom. The cylinder body 6 and the intermediate cylinder 7 may have a common top. The upper part of the intermediate cylinder 7 may be connected to the top cover 11 through a scum guidance taper 10, wherein the scum guidance taper 10 is a conical horn-shaped structure, and a centerline incline angle at a conical outlet of the scum guidance taper 10 ranges from 80° to 85°. The intermediate cylinder 7 may be arranged on support channel steel 4 between the cylinder body 6 and the center cylinder 8. The support channel steel 4 may perform a support function and does not prevent water flow from passing through. The top of the center cylinder 8 may be positioned in the intermediate cylinder 7 and may be provided with a guidance swash plate 22 of the center cylinder, wherein the guidance swash plate 22 is a conical horn-shaped structure, and a centerline incline angle at a conical outlet of the guidance swash plate 22 ranges from 40° to 50°.

The drainpipe 14 may be connected to the top of the cylinder body 6. The top cover 11 may be a conical top. The inner cylinder exhaust pipe 12 may be connected to a side face of the top cover 11. The slag discharge pipe 9 may be connected to a vertex position of the top cover 11. The outer cylinder exhaust pipe 13 may be connected to the scum guidance taper 10. The bottom of the cylinder body 6 may be a conical sludge discharge hopper 3. A centerline incline angle at a conical outlet of the conical sludge discharge hopper 3 may range from 30° to 45°. The water inlet pipe 15, the dissolved gas inlet pipe 1, and the inner cylinder venting and sludge-discharge pipe 16 may be connected to the center cylinder 8 through the conical sludge discharge hopper 3. The outer cylinder venting and sludge-discharge pipe 2 may be connected to the bottom of the conical sludge discharge hopper 3. The air inlet pipe 25 may be connected to the annular aeration pipe 5 through the cylinder body 6. An aeration inner wire head 18 is evenly arranged on the annular aeration pipe 5 that may include ozonation-resistance titanium alloy material. A titanium alloy aerator may be selected and used as the aeration inner wire head 18. The annular aeration pipe 5 may be arranged around the lower position between the cylinder body 6 and the intermediate cylinder 7.

The cylinder body 6 may further include a manhole that may be used to observe the reaction process. Furthermore, the upper part of the cylinder body 6 may be provided, around the intermediate cylinder 7, with a zigzag overflow weir 19. The drainpipe 14 may be arranged at a bottom of the overflow weir 19. The water inlet pipe 15 may be connected to a water inlet pump and a coagulant dosing pump outlet pipe. Raw water may be conveyed to the center cylinder 8 tangentially through the water inlet pipe 15. An end of the dissolved gas inlet pipe 1 may be provided with an ozone-dissolved air releaser 21. The inner cylinder venting and sludge-discharge pipe 16 is arranged at the lower position of the water inlet pipe 15.

The inner cylinder exhaust pipe 12 and the outer cylinder exhaust pipe 13 may be connected, via an exhaust tee 23, to an exhaust manifold provided with an electric exhaust valve 24. The drainpipe 14 may be provided with an outlet electric valve 20. The inner cylinder venting and sludge-discharge pipe 16 may be provided with a center cylinder venting electric valve 17. The outer cylinder venting and sludge-discharge pipe 2 may be provided with a sludge hopper venting electric valve 28. The electric exhaust valve 24, the outlet electric valve 20, the center cylinder venting electric valve 17, and the sludge hopper venting electric valve 28 may be connected to a time relay, and may be automatically turned on/off according to preset interval time.

Finally, a contact region A may be formed in the center cylinder 8. A flotation separation region B may be formed at the upper part of the intermediate cylinder 7. A slag discharge region C may be formed on the top of the intermediate cylinder 7. A sludge precipitation region D may be formed at a lower region between the cylinder body 6 and the center cylinder 8. An ozone oxidation region E may be formed at a lower region between the cylinder body 6 and the intermediate cylinder 7. A ratio of a volume of the contact region A to a volume of the sludge precipitation region D to a volume of the slag collection region C to a volume of the ozone oxidation region E to a volume of the flotation separation region B may be 1:5:5:15:20. A top of the inner cylinder exhaust pipe 12 and a top of the outer cylinder exhaust pipe 13 may be about 0.9 m to 1.2 m higher than that of the slag discharge pipe 9.

The principles of ozone flotation of the present disclosure are as follows.

Water may be tangentially supplied through the water inlet pipe 15, such that the water forms a whirl flow under the flow guidance of the cylinder wall within a narrow and small region of the center cylinder 8. The reflux water mixed with ozone, air and coagulant entering from the dissolved gas inlet pipe 1 is thoroughly mixed with the raw water. The coagulant is coagulated to capture suspended particles. After the reaction, the mixture enters the flotation separation region at the upper part of the device through the guidance swash plate 22. Under the action of the ozone-dissolved air releaser 21, the ozone and the air form a large number of tiny bubbles. The ozone tiny bubbles have large superficial area and can oxidize organic matters in the raw water. Under the catalytic action of the coagulant, a large number of hydroxyl radicals are produced by ozonolysis, which can further remove refractory organic matters in the raw water. A part of oxidation products are hydrophobic substances, which can be captured by coagulant floc particles based on coagulation flotation and thus be separated.

The principles of ozone oxidation of the present disclosure are as below.

The ozone enters the annular aeration pipe 5 through the air inlet pipe 25, and the aeration inner wire head 18 performs aeration. In one aspect, located in an outer ring of the device, the ozone oxidation region is smaller in radius but is larger in volume, and longer hydraulic retention time provides better conditions for sufficient reaction of the ozone. In another aspect, after the ozone flotation treatment in the previous stage, the effluent turbidity is low, and the ozone in the oxidation unit is mainly consumed due to the removal of organic matters, which improves the utilization rate of the ozone.

The principles of slag discharge of the present disclosure are as below:

On/off state of the outlet electric valve 20 and the electric exhaust valve 24 is controlled by the time relay to implement the rise and fall of the liquid level. In this way, the slag discharge and the operation of the device are normally performed.

The principles of sludge discharge of the present disclosure are as below:

The outer cylinder venting and sludge-discharge pipe 2 and the inner cylinder venting and sludge-discharge pipe 16 are connected to the time relay, and the center cylinder venting electric valve 17 and the sludge hopper venting electric valve 28 are respectively turned on/off according to preset interval time, such that sludge deposited in the conical sludge discharge hopper 3 and the center cylinder 8 is discharged. A high-pressure difference of the sludge level of the device makes it convenient to discharge the sludge.

Procedures for advanced sewage treatment using the above device are as follows.

1. In normal operation, the outlet electric valve 20 and the electric exhaust valve 24 are simultaneously turned on, and the center cylinder venting electric valve 17 and the sludge hopper venting electric valve 28 are simultaneously turned off, such that the raw water in the water inlet pipe 15 and ozone-dissolved water in the dissolved gas inlet pipe 1 are thoroughly mixed in a reaction region A of the center cylinder 8, and the ozone-dissolved air releaser releases a large number of tiny ozone bubbles. The mixed water enters the flotation separation region B upward, and scums float up to the slag collection region C under the action of the tiny bubbles. The raw water subject to solid-liquid separation flows downwards from the center cylinder 8 and the intermediate cylinder 7 to the oxidation region E, flows out from the top of the oxidation region E through the zigzag overflow weir 19, and is discharged through the drainpipe 14.

2. In the center cylinder 8, the ozone in the tiny bubbles oxidizes the organic matters in the water, minute particles are captured by the coagulant to form flocs, and the tiny bubbles may carry the flocs to the slag collection region C for solid-liquid separation.

3. In the slag discharge mode, the outlet electric valve 20 and the electric exhaust valve 24 are simultaneously turned off, and the center cylinder venting electric valve 17 and the sludge hopper venting electric valve 28 are simultaneously turned off, such that the liquid level of the device continues to rise until the scums are discharged completely through the slag discharge pipe 9. Thereafter, the water inlet pump is turned off, and the outlet electric valve 20 and the electric exhaust valve 24 are turned on. After the liquid level is continuously lowered to the centerline of a notch of the overflow weir 19, the water inlet pump is turned on to start normal operation. Thereafter, the periodic operation of the treatment and slag discharge is achieved by turning on/off the electric valve.

4. When the sludge precipitation region D on the bottom accumulates sludge such that the sludge-water interface rises to 60% of the depth of the conical sludge discharge hopper 3, the sludge hopper venting electric valve 28 is turned on to discharge the sludge accumulated in the conical sludge discharge hopper 3. When there is too much sludge accumulated at the bottom of the center cylinder 8, the center cylinder venting electric valve 17 is turned on to discharge the sludge accumulated in the center cylinder 8.

In conclusion, the device provided by the present disclosure is divided into a reaction region A, a flotation separation region B, and an ozone oxidation region E by the center cylinder 8, the intermediate cylinder 7, and the cylinder body 6. The lateral arrangement and the combination use of electric valves allow the device to have advantages of high-efficiency ozone utilization, high-efficiency separation of slag from water, and automatic slag discharge and automatic sludge discharge, etc.

The invention claimed is:

1. A composite ozone flotation integrated device, comprising: a cylinder body, an intermediate cylinder, and a center cylinder that are coaxial, wherein the cylinder body and the center cylinder have a common bottom, wherein the cylinder body and the intermediate cylinder have a common top, wherein the intermediate cylinder is arranged on support channel steel between the cylinder body and the center cylinder, wherein a top of the center cylinder is located in the intermediate cylinder, wherein the top of the center cylinder is open-mouthed, wherein an upper part of the cylinder body is provided with a drainpipe, wherein a top of the cylinder body is provided with an inner cylinder exhaust pipe and a slag discharge pipe, wherein a first upper part of the intermediate cylinder is provided with an outer cylinder exhaust pipe, wherein a lower part of the center cylinder is connected to a water inlet pipe, a dissolved gas inlet pipe, and a venting and sludge-discharge pipe which is connected to an inner cylinder, wherein an annular aeration pipe which has an aeration inner wire head is provided at a lower position between the cylinder body and the intermediate cylinder, wherein the annular aeration pipe is connected to an air inlet pipe, wherein a lower part of the cylinder body is connected to a venting and sludge-discharge pipe which is connected to an outer cylinder, wherein a contact region A is formed in the center cylinder, wherein a flotation separation region B is formed at a second upper part of the intermediate cylinder, wherein a slag discharge region C is formed on the top of the intermediate cylinder, wherein a sludge precipitation region D is formed at a lower region between the cylinder body and the center cylinder, and wherein an ozone oxidation region E is formed at a lower region between the cylinder body and the intermediate cylinder.

2. The composite ozone flotation integrated device according to claim 1, wherein the bottom of the cylinder body has a bottom plate, wherein the top of the cylinder body has a top cover, wherein the bottom plate is arranged on an equipment base, wherein the top cover is a conical top, wherein the inner cylinder exhaust pipe is connected to the top cover, wherein the bottom of the cylinder body is a conical sludge discharge hopper, and wherein a centerline incline angle at a conical outlet of the conical sludge discharge hopper ranges from 30° to 45°.

3. The composite ozone flotation integrated device according to claim 1, wherein a third upper part of the intermediate cylinder is connected to the top thereof through a scum guidance taper, wherein the scum guidance taper is a conical horn-shaped structure, wherein a centerline incline angle at a conical outlet of the scum guidance taper ranges from 80° to 85°, and wherein the outer cylinder exhaust pipe is connected to the scum guidance taper.

4. The composite ozone flotation integrated device according to claim 1, wherein the top of the center cylinder is provided with a guidance swash plate cylinder, wherein the guidance swash plate is a conical horn-shaped structure, and wherein a centerline incline angle at a conical outlet of the guidance swash plate ranges from 40° to 50°.

5. The composite ozone flotation integrated device according to claim 1, wherein the upper part of the cylinder body is provided, around the intermediate cylinder, with a zigzag overflow weir; and wherein the drainpipe is arranged at a bottom of the overflow weir.

6. The composite ozone flotation integrated device according to claim 1, wherein the water inlet pipe is connected to a water inlet pump and a coagulant dosing pump outlet pipe, wherein the water inlet pipe tangentially conveys raw water to the center cylinder, and wherein an end of the dissolved gas inlet pipe is provided with an ozone-dissolved air releaser.

7. The composite ozone flotation integrated device according to claim 1, wherein the inner cylinder exhaust pipe and the outer cylinder exhaust pipe are connected, via an exhaust tee, to an exhaust manifold provided with an electric exhaust valve, wherein the drainpipe is provided with an outlet electric valve, wherein the inner cylinder venting and sludge-discharge pipe is provided with a center cylinder venting electric valve, and wherein the outer cylinder venting and sludge-discharge pipe is provided with a sludge hopper venting electric valve.

8. The composite ozone flotation integrated device according to claim 7, wherein the electric exhaust valve, the outlet electric valve, the center cylinder venting electric valve, and the sludge hopper venting electric valve are connected to a time relay, and are automatically turned on/off according to a preset interval time.

9. The composite ozone flotation integrated device according to claim 1, wherein a ratio of a volume of the contact region A to a volume of the sludge precipitation region D to a volume of the slag discharge region C to a volume of the ozone oxidation region E to a volume of the flotation separation region B is 1:5:5:15:20, and wherein a top of the inner cylinder exhaust pipe and a top of the outer cylinder exhaust pipe are about 0.9~1.2 m higher than that of the slag discharge pipe.

10. The composite ozone flotation integrated device according to claim 1, wherein a ratio of a height of the cylinder body to a height of the intermediate cylinder to a height of the center cylinder is 10:6.5~8:4~5, and wherein a ratio of a diameter of the cylinder body to a bottom diameter of the intermediate cylinder to a diameter of the center cylinder is 5:(3~3.5):(1~1.5).

* * * * *